(No Model.)

T. F. EVANS.
HORSESHOE.

No. 420,151. Patented Jan. 28, 1890.

Witnesses
C. H. Contoyee.
C. O. Davis

Inventor
T. Frank Evans
By his Attorney
C. M. Alexander

UNITED STATES PATENT OFFICE.

THOMAS FRANK EVANS, OF LITITZ, PENNSYLVANIA.

HORSESHOE.

SPECIFICATION forming part of Letters Patent No. 420,151, dated January 28, 1890.

Application filed October 17, 1889. Serial No. 327,262. (No model.)

*To all whom it may concern:*

Be it known that I, THOMAS FRANK EVANS, a citizen of the United States, residing at Lititz, in the county of Lancaster and State of Pennsylvania, have invented certain new and useful Improvements in Horseshoes, of which the following is a specification, reference being had therein to the accompanying drawings, in which—

Figure 1:
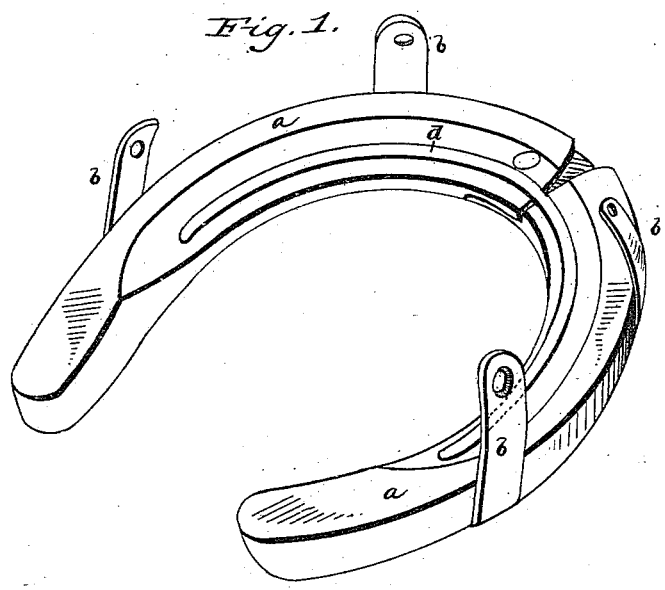
Figure 2:
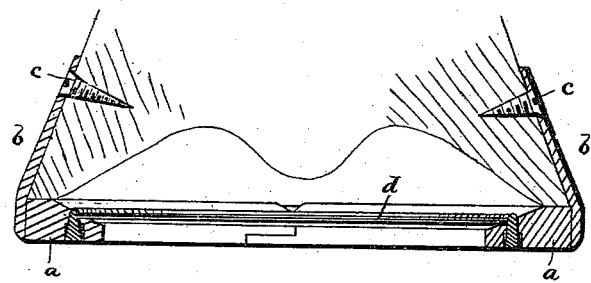
Figure 3:
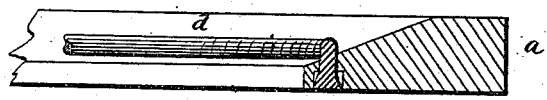

Figure 1 represents a perspective view of my improved detachable horseshoe; Fig. 2, a transverse sectional view of the shoe applied to a hoof, and Fig. 3 a detail sectional view slightly enlarged.

The invention has for its object the production of a horseshoe which may be readily clasped upon the hoof without the use of nails and removed at will, the said shoe being principally employed as a temporary shoe to be applied upon the road in case of accidental loss of one of the permanent shoes, as will presently appear.

The shoe is provided with means whereby it may be permanently attached to the hoof, if desired.

In the drawings, $a\ a$ designate the two sections of the shoe, which are pivoted together at the toe, the overlapping ends of these sections being cut away or shouldered to bring the surfaces flush with each other. Formed upon or attached to these sections are vertical clasping-ears $b$, which may be made malleable, so as to be bent to the shape of the hoof. Screws $c$ may be passed through the holes in the upper ends of the ears $b$ and screwed into the hoof, as shown in Fig. 2, whereby the shoe is held so rigidly and firmly that it may be used, if desired, as a permanent shoe.

The inner upper corner of the shoe is cut away or beveled off for the reception of a contracting bow-spring $d$, which has its two ends secured to the respective shoe-sections near the heel of the shoe, and whose shape conforms approximately to that of the shoe. By beveling out the shoe for the reception of the spring the latter is prevented from coming in contact with the horse's hoof.

The object in placing the bow-spring on top of the shoe, between the shoe and hoof, is to prevent it being injured by stones and other obstructions while in use on the animal's hoof. The ends of the spring are bent downwardly and passed through holes in the respective shoe-sections and riveted, thereby securely attaching the spring to the shoe. In order to prevent the riveted or struck-up ends of the spring from protruding, I enlarge the hole in the shoe, as shown clearly in Fig. 3. The tendency of the strong spring $d$ being to press the heels of the shoe together, it is evident that when the shoe is opened and placed upon the hoof it will securely clamp the same by means of the ears $b$, and be thereby temporarily held in place.

This shoe is particularly advantageous as an "extra" shoe to be temporarily used in case of accidental loss of one of the permanent shoes. It may be, however, as hereinbefore set forth, attached rigidly to the hoof by means of screws or other devices.

Having thus fully described my invention, what I claim is—

The combination of the pivoted shoe-sections pivoted together at their forward ends and provided with the clamping-ears, and a contracting bow-spring secured to the upper side of the shoe, the ends of this spring being secured to the respective sections near their heel ends, substantially as described.

In testimony whereof I affix my signature in presence of two witnesses.

T. FRANK EVANS.

Witnesses:
C. D. DAVIS,
C. W. CONBOYE.